United States Patent
Huang et al.

(10) Patent No.: US 9,069,909 B2
(45) Date of Patent: Jun. 30, 2015

(54) SERVER AND IDENTIFIER SYNCHRONIZATION METHOD

(71) Applicants: Inventec (Pudong) Technology Corporation, Shanghai (CN); Inventec Corporation, Taipei (TW)

(72) Inventors: Wei Huang, Shanghai (CN); Quan-Yuan Chen, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 2 days.

(21) Appl. No.: 14/158,996

(22) Filed: Jan. 20, 2014

(65) Prior Publication Data

US 2015/0149660 A1    May 28, 2015

(30) Foreign Application Priority Data

Nov. 28, 2013    (CN) .......................... 2013 1 0625220

(51) Int. Cl.
G06F 3/00 (2006.01)
G06F 13/38 (2006.01)

(52) U.S. Cl.
CPC .................................... *G06F 13/385* (2013.01)

(58) Field of Classification Search
None
See application file for complete search history.

(56) References Cited

U.S. PATENT DOCUMENTS

| | | | | |
|---|---|---|---|---|
| 7,330,966 | B2 * | 2/2008 | Ice et al. | 713/2 |
| 7,877,521 | B2 * | 1/2011 | Suzuki et al. | 710/10 |
| 2007/0088943 | A1 * | 4/2007 | Phelps et al. | 713/2 |
| 2008/0256351 | A1 * | 10/2008 | Natarajan | 713/2 |
| 2010/0100611 | A1 * | 4/2010 | Hatasaki et al. | 709/221 |
| 2012/0131157 | A1 * | 5/2012 | Gospodarek et al. | 709/222 |

* cited by examiner

*Primary Examiner* — Elias Mamo
(74) *Attorney, Agent, or Firm* — Huffman Law Group, PC

(57) ABSTRACT

A server and an identifier synchronization method are provided, and the server includes a network card, hardware peripherals and a basic input output system. The network card stores at least one identifier. The basic input output system starts operating to acquire the at least one identifier of the network card and write the at least one identifier into each hardware peripheral after the server is booted.

8 Claims, 2 Drawing Sheets

SERVER AND IDENTIFIER SYNCHRONIZATION METHOD

CROSS-REFERENCE TO RELATED APPLICATIONS

This non-provisional application claims priority under 35 U.S.C. §119(a) on Patent Application No(s). 201310625220.9 filed in China on Nov. 28, 2013, the entire contents of which are hereby incorporated by reference.

BACKGROUND OF THE INVENTION

1. Technical Field of the Invention

The disclosure relates to a server and an identifier synchronization method, and more particularly to a server and an identifier synchronization method which are capable of synchronizing identifiers in every hardware peripheral in the server.

2. Description of the Related Art

A subsystem identifier (SSID) and a subsystem vendor identifier (SVID) are independently defined for various hardware peripherals in a main board by the Peripheral Component Interconnect Special Interest Group (PCI-SIG), are used for identifying what kind of product a main board belongs to and by which manufacturer this main board is produced, and are used for performing the Windows® Hardware Certification Kit (WHCK) test provided by Microsoft®. If the identifiers of hardware peripherals in a main board cannot be synchronized, this main board will not pass the WHCK test.

Generally, identifiers are written into both Basic Input Output System (BIOS) firmware and a network card. However, it may be very complicated for the main board to write identifiers into both of the BIOS firmware and the network card in advance. Moreover, if a main board in a server needs to be applicative to different systems and then needs to change the subsystem identifier in the BIOS firmware, the manufacturer has to replace the original version of the BIOS firmware corresponding to the main board by a new version for different systems and this new version of the BIOS firmware has to be retested. This will place a design burden on BIOS and a test burden on the manufacturer.

SUMMARY OF THE INVENTION

The disclosure provides an identifier synchronization method, adapted to a server including a network card and hardware peripherals, and including: booting the server; enabling a basic input output system (BIOS) in the server to operate and acquire at least one identifier of the network card; and writing the at least one identifier into the hardware peripherals by the BIOS.

In an embodiment, the above at least one identifier includes a subsystem identifier and a subsystem vendor identifier.

In an embodiment, the identifier synchronization method further includes: before booting the server, writing the at least one identifier into non-volatile storage in the network card.

In the above embodiment, the at least one identifier stored in the non-volatile storage is mapped and stored into peripheral component interconnect (PCI) configuration space in the network card after booting the server, and the BIOS acquires the at least one identifier from the PCI configuration space.

In an embodiment, when the BIOS writes the at least one identifier into the hardware peripherals, the at least one identifier is written into the PCI configuration space of each of the hardware peripherals; after the server is shut down, the at least one identifier in the PCI configuration space of each of the hardware peripherals is lost; and after the server is rebooted, the BIOS re-acquires the at least one identifier from the network card and writes the re-acquired at least one identifier into the PCI configuration space of each of the hardware peripherals.

The disclosure provides a server including: a network card for storing at least one identifier; a plurality of hardware peripherals; and a BIOS for starting operating after the server is booted, acquiring the at least one identifier of the network card, and writing the at least one identifier into each of the hardware peripherals.

In an embodiment, the at least one identifier comprises a subsystem identifier and a subsystem vendor identifier.

In an embodiment, the at least one identifier is written into non-volatile storage of the network card by a writing module.

In an embodiment, the at least one identifier stored in the non-volatile storage is mapped and stored into the PCI configuration space of the network card after the server is booted, and the BIOS acquires the at least one identifier from the PCI configuration space of the network card.

In an embodiment, the at least one identifier is written into the PCI configuration space of each of the hardware peripherals; after the server is shut down, the at least one identifier in the PCI configuration space of each of the hardware peripherals is lost; and after the server is rebooted, the BIOS re-acquires the at least one identifier from the network card and writes the re-acquired at least one identifier into the PCI configuration space of each of the hardware peripherals.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
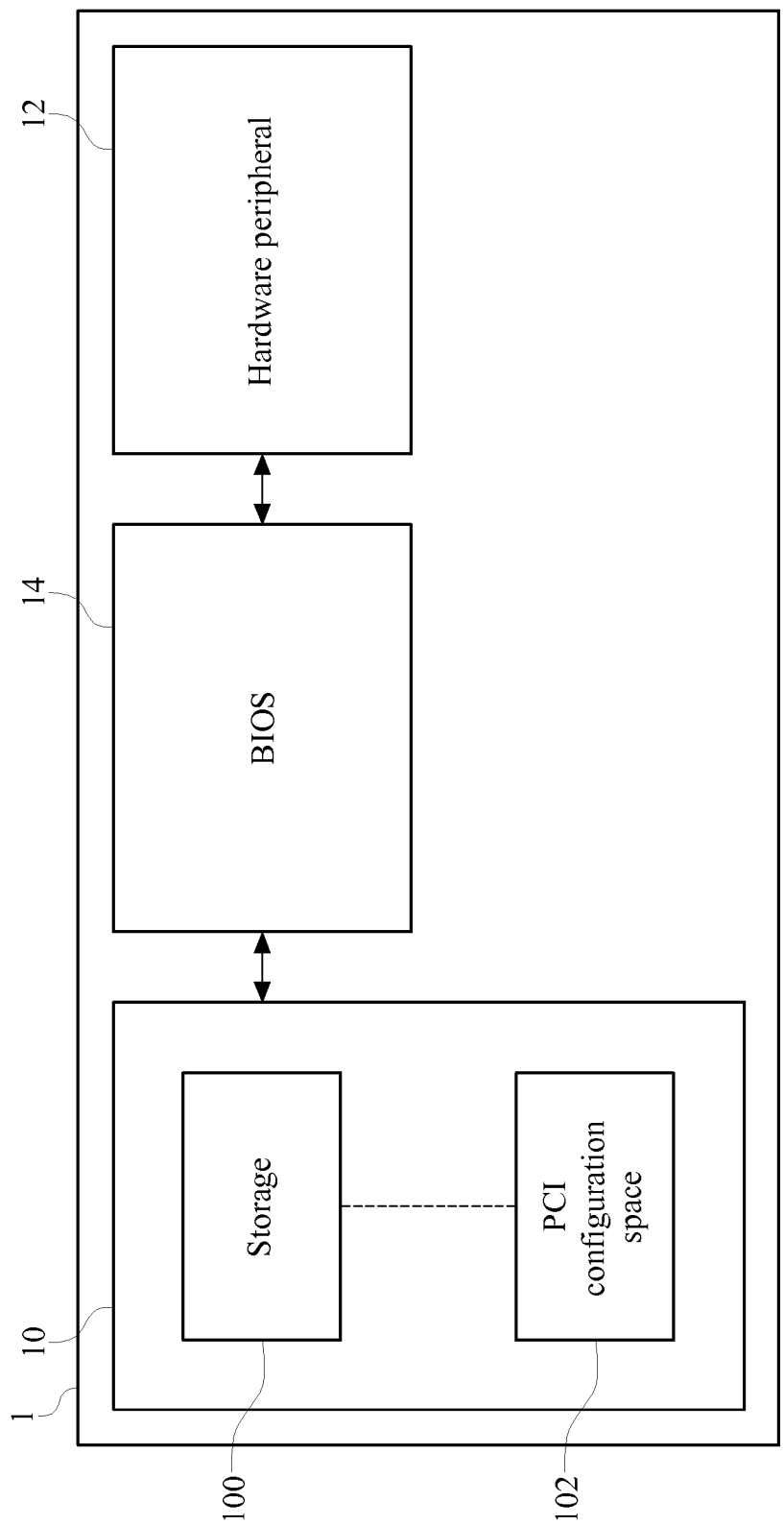
FIG. 1 is a block diagram of a server according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is block diagram of a server 1 according to an embodiment of the disclosure. The server 1 mainly includes a network card (i.e., a network interface card and a network interface controller) 10, a plurality of hardware peripherals 12 and a basic input output system (BIOS) 14 which are described below.

The network card 10 and the hardware peripherals 12 can be dismounted from the server 1. The network card 10 includes a storage 100 storing at least a set of identifiers. For example, the identifiers include a subsystem identifier (SSID), a subsystem vendor identifier (SVID), a vendor identifier (VID) and a device identifier (DID). The subsystem identifier here is an identifier for an apparatus of an original equipment manufacturer, and the subsystem vendor identifier here is an identifier for the original equipment manufacturer. Generally, the subsystem identifier and the subsystem vendor identifier will be combined to form an identifier for test tasks.

The identifiers are written into the storage 100 of the network card 10 through, e.g., a writing module (not shown) which may be, for example but not limited to a compiler (or an assembler) or an executable program, and this writing process can be done during the manufacturing of the main board or be done by software after the main board has been produced.

For example, the storage 100 can be a non-volatile storage such as a programmable read-only memory (PROM), an erasable programmable read-only memory (EPROM), an electrically erasable programmable read-only memory (EEPROM) or a flash memory.

The type and quantity of hardware peripherals can be defined according to particular requirements. For example, the hardware peripheral 12 can be a hard disk drive (HDD), a floppy disk (FD), an optical disk drive, or an interface card (i.e., an adapter), e.g., a display card, a sound card or a TV card.

Because the bus of the network card 10 has to meet a standard of peripheral component interconnect (PCI) bus or PCI express bus, the network card 10 has PCI configuration space that includes registers. When the server 1 is booted, the at least one identifier in the storage 100 will be mapped and stored into the PCI configuration space. When the server 1 is shut down, the at least one identifier temporally stored in the PCI configuration space will be lost. In other words, the at least one identifier is stored in a preset location in the storage 100, and the information, i.e., the identifier, at this preset location is automatically mapped and stored into the PCI configuration space of the network card 10 after the network card 10 starts operating. When the server 1 is shut down, the network card 10 will be disabled due to the stop of power supply. Herein, the at least one identifier in the PCI configuration space of the network card 10 will be lost. Once the network card 10 is re-supplied with power to work, the at least one identifier in the storage 100 will be automatically mapped and stored into the PCI configuration space of the network card 10.

When the server 1 is booted, the BIOS 14 acquires the at least one identifier from the network card 10 and then writes the at least one identifier into the hardware peripheral 12. Specifically, because the at least one identifier in the storage 100 will be mapped and stored to the PCI configuration space in the network card 10 when the server 1 is booted, the BIOS 14 can acquire the at least one identifier from the PCI configuration space of the network card 10, write the at least one identifier into the PCI configuration space of each of the hardware peripherals 12.

Figure 2:
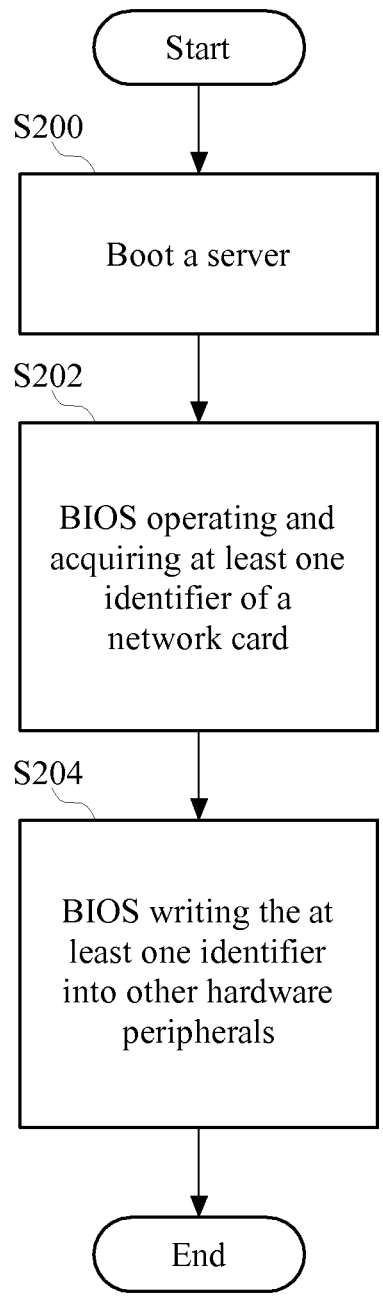
FIG. 2 is a flowchart of an identifier synchronization method according to an embodiment of the disclosure.

FIG. 2 is a flowchart of an identifier synchronization method according to an embodiment of the disclosure. The identifier synchronization method in FIG. 2 is adapted to the server 1 in FIG. 1. The details of the identifier synchronization method are described below.

In step S200, users can boot the server 1. In step S202, the BIOS 14 starts operating and acquires at least one identifier of the network card 10. In step S204, the BIOS 14 writes the at least one identifier into the hardware peripherals 12.

For example, the at least one identifier can be a combination of a subsystem identifier and a subsystem vendor identifier.

In an embodiment, before the server 1 is booted (step S200), the at least one identifier is written into the storage 100.

In an embodiment, after the server 1 is booted (step S200), the at least one identifier in the storage 100 is mapped and stored into the PCI configuration space of the network card 10. Then, the BIOS 14 can acquire the at least one identifier from the PCI configuration space of the network card 10 and write the at least one identifier into PCI configuration space of other hardware peripherals.

As set forth above, the disclosure provides a server and an identifier synchronization method. The BIOS acquires at least one identifier of the network card and writes the at least one identifier into other hardware peripherals in the server when the server is booted. Thus, when the server intends to change the subsystem identifier or subsystem vendor identifier of each of the hardware peripherals in the server, only the subsystem identifier or subsystem vendor identifier in the storage of the network card needs to be updated. Then, the BIOS can synchronously write this new subsystem identifier or subsystem vendor identifier into hardware peripherals in the server.

What is claimed is:

1. An identifier synchronization method, adapted to a server that comprises a network card and a plurality of hardware peripherals, and comprising:
    booting the server;
    enabling a basic input output system (BIOS) in the server to operate and acquire at least one identifier of the network card; and
    writing the at least one identifier into the hardware peripherals by the BIOS;
    wherein, when the BIOS writes the at least one identifier into the hardware peripherals, the at least one identifier is written into the PCI configuration space of each of the hardware peripherals; after the server is shut down, the at least one identifier in the PCI configuration space of each of the hardware peripherals is lost; and after the server is rebooted, the BIOS re-acquires the at least one identifier from the network card and writes the re-acquired at least one identifier into the PCI configuration space of each of the hardware peripherals.

2. The identifier synchronization method according to claim 1, wherein the at least one identifier comprises a subsystem identifier and a subsystem vendor identifier.

3. The identifier synchronization method according to claim 1, before the server is booted, further comprising: writing the at least one identifier into a non-volatile storage in the network card.

4. The identifier synchronization method according to claim 3, wherein the at least one identifier stored in the non-volatile storage is mapped and stored to peripheral component interconnect (PCI) configuration space of the network card after the server is booted, and the BIOS acquires the at least one identifier from the PCI configuration space.

5. A server, comprising:
    a network card for storing at least one identifier;
    a plurality of hardware peripherals; and
    a BIOS for starting operating after the server is booted and acquiring the at least one identifier of the network card, and writing the at least one identifier into each of the hardware peripherals;
    wherein the at least one identifier is written into the PCI configuration space of each of the hardware peripherals; after the server is shut down, the at least one identifier in the PCI configuration space of each of the hardware peripherals is lost; and after the server is rebooted, the BIOS re-acquires the at least one identifier from the network card and writes the re-acquired at least one identifier into the PCI configuration space of each of the hardware peripherals.

6. The server according to claim 5, wherein the at least one identifier comprises a subsystem identifier and a subsystem vendor identifier.

7. The server according to claim 5, wherein the at least one identifier is written into a non-volatile storage of the network card by a writing module.

8. The server according to claim 7, wherein the at least one identifier stored in the non-volatile storage is mapped and stored into the PCI configuration space of the network card after the server is booted, and the BIOS acquires the at least one identifier from the PCI configuration space of the network card.

* * * * *